United States Patent
Tanaka et al.

(10) Patent No.: US 7,653,723 B2
(45) Date of Patent: Jan. 26, 2010

(54) EVENT NOTIFYING ARRANGEMENTS SHOWING REASON OF GENERATION OF EVENT AND/OR PROMPTING A PROCESS CORRESPONDING TO THE EVENT

(75) Inventors: Mayuko Tanaka, Yokohama (JP); Hiroyuki Koreeda, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 406 days.

(21) Appl. No.: 11/369,076

(22) Filed: Mar. 7, 2006

(65) Prior Publication Data
US 2006/0212571 A1   Sep. 21, 2006

(30) Foreign Application Priority Data
Mar. 17, 2005   (JP)   ............... 2005-076238

(51) Int. Cl.
*G06F 15/173*   (2006.01)
(52) U.S. Cl. .............. 709/224; 709/217; 709/223; 719/318; 719/328; 715/700; 715/736
(58) Field of Classification Search ......... 709/223–224, 709/217; 719/318, 328; 715/700, 736
See application file for complete search history.

(56) References Cited

U.S. PATENT DOCUMENTS

| | | | | |
|---|---|---|---|---|
| 6,662,224 | B1 * | 12/2003 | Angwin et al. .......... 709/224 |
| 6,854,074 | B2 * | 2/2005 | McLellan et al. .......... 714/39 |
| 6,910,071 | B2 * | 6/2005 | Quintero et al. .......... 709/224 |
| 6,943,681 | B2 * | 9/2005 | Rezvani et al. .......... 340/506 |
| 7,017,148 | B2 * | 3/2006 | Kumar .......... 717/114 |
| 7,461,297 | B2 * | 12/2008 | McLellan et al. .......... 714/39 |
| 7,552,200 | B2 * | 6/2009 | Dodrill et al. .......... 709/219 |
| 2002/0029256 | A1 * | 3/2002 | Zintel et al. .......... 709/218 |
| 2002/0065950 | A1 * | 5/2002 | Katz et al. .......... 709/318 |
| 2002/0143932 | A1 * | 10/2002 | Quintero et al. .......... 709/224 |
| 2003/0055893 | A1 * | 3/2003 | Sato et al. .......... 709/204 |
| 2004/0192195 | A1 * | 9/2004 | Soga et al. .......... 455/11.1 |
| 2005/0138179 | A1 * | 6/2005 | Encarnacion et al. .......... 709/227 |
| 2005/0138193 | A1 * | 6/2005 | Encarnacion et al. .......... 709/230 |
| 2006/0041924 | A1 * | 2/2006 | Bushmitch et al. .......... 725/132 |
| 2006/0184661 | A1 * | 8/2006 | Weisman et al. .......... 709/224 |

(Continued)

FOREIGN PATENT DOCUMENTS

JP    10-289267    10/1998

(Continued)

OTHER PUBLICATIONS

UpnP Device Architecture 1.0 Version 1.0.1, Dec. 2003.

*Primary Examiner*—Alina N. Boutah
(74) *Attorney, Agent, or Firm*—Antonelli, Terry, Stout & Kraus, LLP.

(57) ABSTRACT

For enabling to deal with various kinds of events, but without knowing the meaning of the event issued by network equipments, an event notifying equipment notifies URL for an event receiving equipment to access a HTML file corresponding to the event, in the form of an event parameter, thereby providing a HTML file for indicating a reason of generating the event and a HTML file for prompting a process corresponding to the event, in response to a request from a Web browser. An event receiving apparatus is able to execute the event process only by accessing to the URL included in the event parameter.

4 Claims, 2 Drawing Sheets

U.S. PATENT DOCUMENTS

| | | | |
|---|---|---|---|
| 2006/0195545 A1* | 8/2006 | Kikkawa et al. | 709/217 |
| 2006/0245403 A1* | 11/2006 | Kumar | 370/338 |
| 2007/0005760 A1* | 1/2007 | Simonnet et al. | 709/224 |
| 2007/0115996 A1* | 5/2007 | Shitano et al. | 370/392 |

FOREIGN PATENT DOCUMENTS

| | | |
|---|---|---|
| JP | 10-307792 | 11/1998 |
| JP | 11-242546 | 9/1999 |
| JP | 2001-229151 | 8/2001 |
| JP | 2002-099477 | 4/2002 |
| JP | 2003-141063 | 5/2003 |
| JP | 2003-150487 | 5/2003 |
| JP | 2003-228529 | 8/2003 |

* cited by examiner

108 URL a

109 URL b

EVENT NOTIFYING ARRANGEMENTS SHOWING REASON OF GENERATION OF EVENT AND/OR PROMPTING A PROCESS CORRESPONDING TO THE EVENT

The present application claims priority from Japanese patent application No. JP 2005-076238 filed on Mar. 17, 2005, the content of which is hereby incorporated by reference into this application.

BACKGROUND OF THE INVENTION

The present invention relates to a network apparatus and an event processing method, in particular, enabling to notify and/or receive an event through a network.

Upon an appearance of a digital television, installing the Web browser therein, and also a recorder enabling to set a program recording with using the Web browser from a personal computer (PC), etc., on the market, advancement or improvement is achieved upon network-enabled audio/visual (AV) equipment. Also, UPnP Device Architecture is a regulation for providing devices, for example, for mutually finding out the equipments connected to the network, thereby operating, or an event notification of notifying conditional change(s), which is/are generated within the network equipments, on the network, and it is adopted into the AV equipments and printers; i.e., it becomes a kind of standard regulation in that industry (shown in the following Non-Patent Document 1).

[Non-Patent Document 1] UPnP Device Architecture

BRIEF SUMMARY OF THE INVENTION

Although the UPnP Device Architecture provides the device for the event notification, however for the network equipment of receiving the event therefrom, it is necessary to know the meaning and the processing method thereof, for every event, so as to execute the process fitting to that event. For that reason, a controller for operating other network equipments has an implementation of installing the processes in advance, fitting to the events to be generated in any kind of the equipments to be operated, but being limited within a certain degree thereof, such as, a camera or a printer, etc. In case when increasing the equipments, i.e., the operable targets, it can be deal with, for the PC, by installing control applications therein, fitting to that operable targets. However, on the contrary to the above, it is difficult to install the program, newly, in such as, a television, for example, after being shipped as a product (i.e., a installed-type equipment). Then, according to the present invention, there is provided a device for an event notification, which needs no interpretation of meaning of the event notified, and processing thereof, and thereby making also such installed-type equipments being operable fitting to the events, which are generated within the various kinds of network equipments.

Within the present invention, the network equipment for notifying an event to other network equipment (hereinafter, being called by an "event notifying apparatus") provides a cause or reason of generating the event, a method for processing and/or a user interface for an event processing thereof, in the form of a Web page. And, when notifying the event, the notification is made, through displaying the reason of generating the event, and/or including a URL (Uniform Resource Locater) for accessing a Web page for prompting a process for dealing with the event to a user into an event parameter. The network equipment for receiving the event (hereinafter, being called by a "event receiving apparatus") comprises a Web browser, and it notifies the user that it receives the event from other network equipment, through a popup icon or the like, when receiving the event. When the user shows an intention of executing the event process by means of a remote controller or the like, the Web browser is initiated, and then access is made to the URL included in the event parameter, thereby displaying a screen. The user is able to know the reason of generating the event, or conduct the operation of the event process, with using the browser.

According to the present invention, there is no need of meanings relating to respective events, nor definition of an event for enabling the event process, nor regulation for the processing protocol, between the event notifying apparatus and the event receiving apparatus. The event notifying apparatus notifies the URL for accessing a HTML (HyperText Markup Language) corresponding to the event, in the form of an event parameter, and also provide a HTML file for showing the reason of generating the event corresponding to the request from the Web browser, and/or a HTML file for prompting the process corresponding to the event. The event receiving apparatus enables the event process, but only accessing to the URL included in the event parameter, by means of the Web browser. In this manner, applying the event processing method of the Web method therein enables the event receiving apparatus to conduct the event process, by taking no consideration about the kind of the event notifying apparatus.

BRIEF DESCRIPTION OF THE DRAWINGS

Those and other objects, features and advantages of the present invention will become more readily apparent from the following detailed description when taken in conjunction with the accompanying drawings wherein.

DESCRIPTION OF THE PREFERRED EMBODIMENTS

Figure 1:
FIG. 1 is a view for showing the entire configuration of a network.
Figure 1:
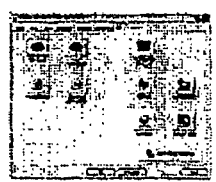
Figure 1:
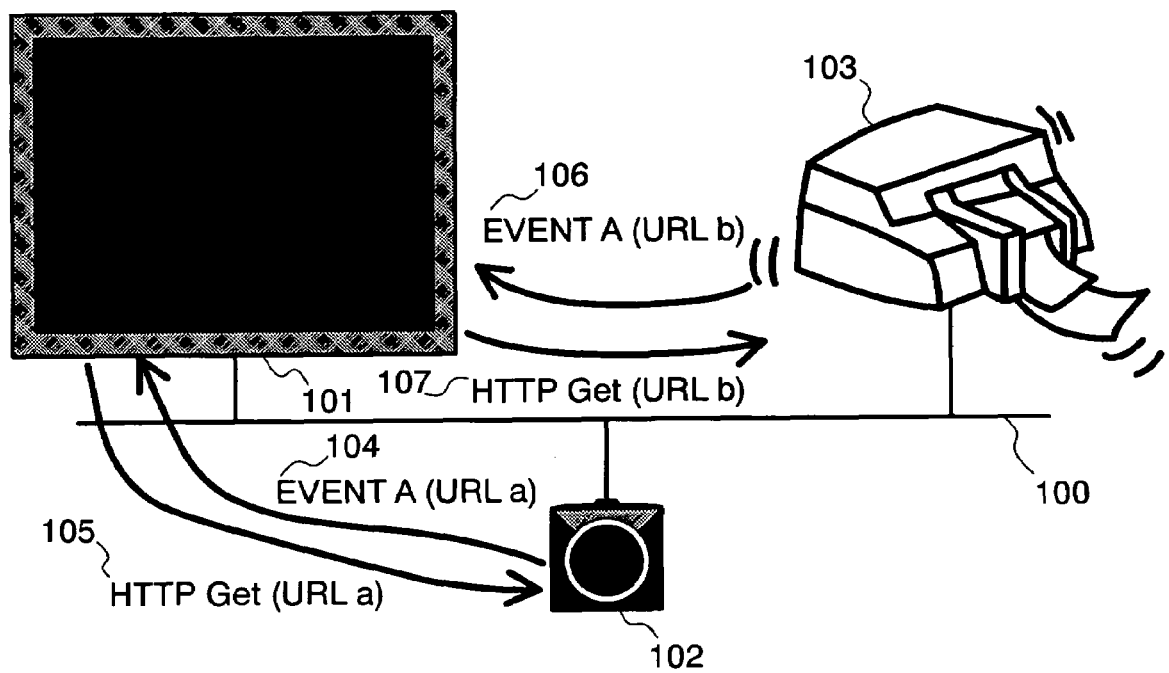
Figure 2:
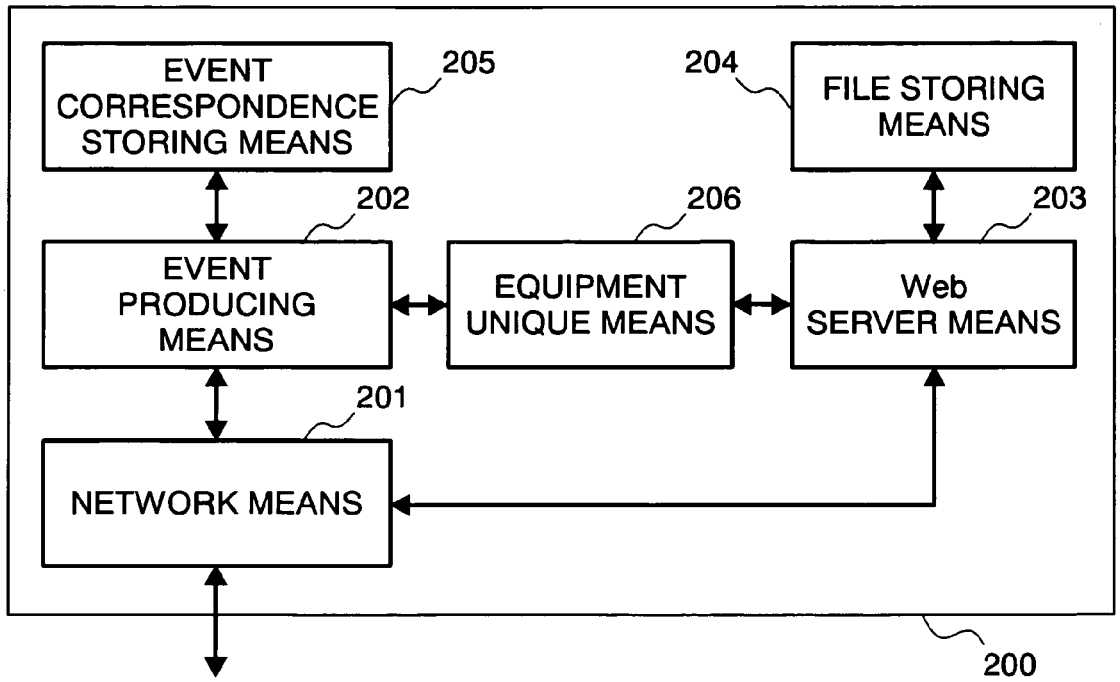
FIG. 2 is a block diagram for showing the structures of an event notifying apparatus.
Figure 3:
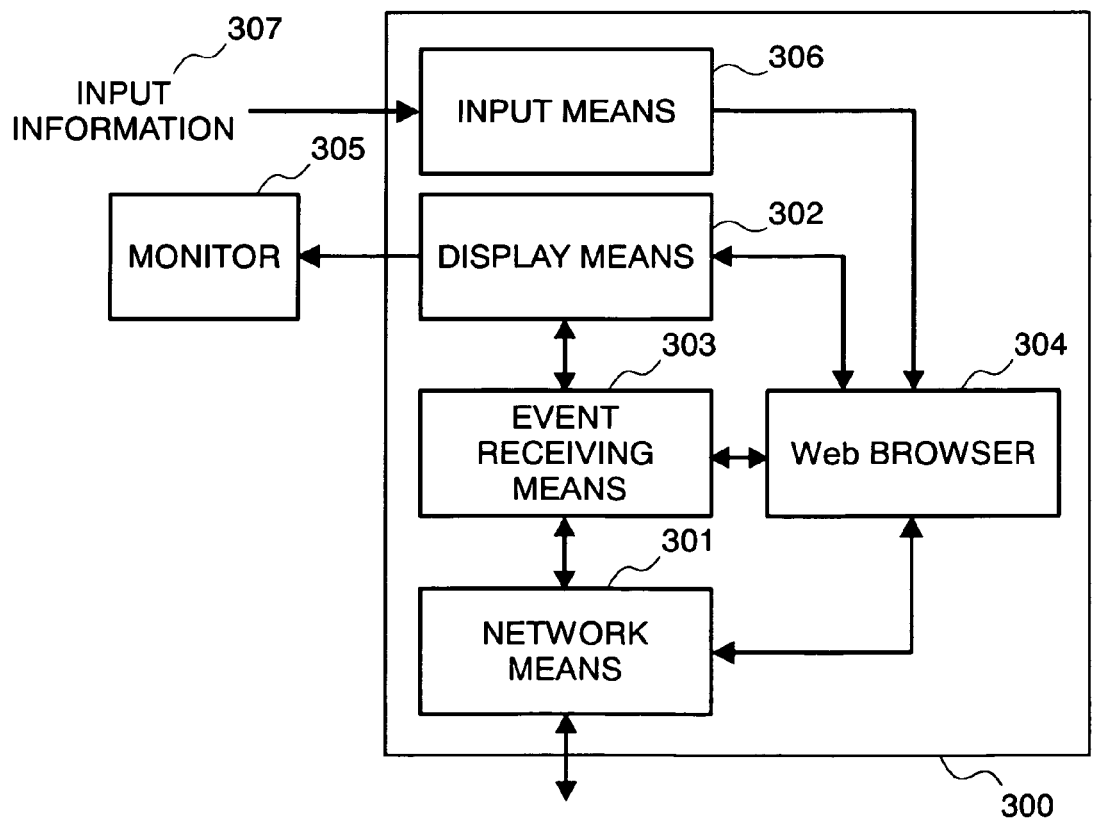
FIG. 3 is a block diagram for showing the structures of an event receiving apparatus.

Hereinafter, an embodiment according to the present invention will be fully explained, by referring to the attached drawings, FIGS. 1 to 3. FIG. 1 shows a home network, which is built up with network equipments according to the present invention. FIG. 2 is the block diagram which shows an example of the structures of the event notifying apparatus according to the present invention. And, FIG. 3 is the block diagram which shows an example of the structures of the event receiving apparatus according to the present invention.

In FIG. 1, reference numerals 101, 102 and 103 depict network equipments, which are connected with a network 100. The reference numerals 102 and 103 depict event notifying apparatuses, each notifying other network equipments of the change within an inner condition of itself, etc. The reference numeral 101 depicts an event receiving apparatus for receiving an event, which is issued by other network equipments. Further, a reference numeral 104 depicts an event message, which the event notifying apparatus 102 issues. This includes a URL of an event process Web page, which the apparatus 102 provides, in the form of an event parameter.

A reference numeral 105 depicts a Web page obtain message, which the event receiving apparatus 101 issues. A reference numeral 108 is a Web screen, which can be obtained by means of the Web page obtain message 105, and as an example thereof, it shows a page for showing a picture, which is picked up by a camera of the network equipment 102. In the similar manner, a reference numeral 106 is an event message, which the event notifying apparatus 103 issues. This includes a URL of the event process Web page, which the apparatus 103 provides, in the form of the event parameter. A reference numeral 107 is a Web page obtain message, which the event receiving apparatus 101 issues. And, a reference numeral 109 is a Web screen, which can be obtained by means of the Web page obtain message 107. As an example, there is shown a setup screen of the network equipment 103.

FIG. 2 is the block diagram for showing the structures of the event notifying apparatus. A reference 200 depicts the event notifying apparatus, corresponds to those 102 and 103 in FIG. 1. Herein, parts depending on separate functions of the apparatus are omitted from. A reference numeral 201 depicts a network means for conducting transmission of data between the other network apparatuses through the network. A reference numeral 202 depicts an event producing means for producing an event and notifying the event to the network through the network means, 203 a Web server, 204 a file storing means for storing information, such as, the HTML file, which the Web server transmits upon requests from other network equipments, for example, 205 an event correspondence storing means for managing URL information corresponding to the events, and 206 a means inherent or unique to the equipment (an equipment unique means), for converting operation of the equipment into control protocol unique to the equipment, which is required from the Web browser of the other network equipment to the Web server, or for requesting the event producing means to notify the conditional change generated within the equipment to the network, in the form of the event.

Within the event notifying apparatus 200, a request is made from the equipment unique means 206 to the event producing means 202 when the conditional change is generated, to be an object of event notification. The event producing means 202 required to issue an event obtains the URL of the Web page for executing the process corresponding to the event to be issued, by referring to the event correspondence means 205, and issues it to the other network equipment as the event parameter. As a method for notifying the event, the URL is added into a user parameter region or area, in accordance with the event protocol of the UPnP, for example.

FIG. 3 is a block diagram for showing the structures of the event receiving apparatus. A reference numeral 300 depicts the event receiving apparatus, and it corresponds to 101 shown in FIG. 1. A reference numeral 301 depicts a network means for transmitting data between the other networks apparatuses through the network. A reference numeral depicts a means for receiving the event notified through the network. A reference numeral 302 depicts a display means for producing signals, which outputs a user I/G screen that the event receiving means produces and a Web browser screen of 304, for the purpose of monitoring thereof. The reference numeral 304 is a Web browser. A reference numeral 305 depicts a monitor. A reference numeral 306 depicts an input means, and it transmits the input signal 305, which is inputted through a infrared remote controller, a mouse, and/or a keyboard, etc., to the Web browser 304.

In the event receiving apparatus 300, receipt of the event is displayed on the monitor with using an icon or the like, thereby notifying it to a user through the display means 302, when the event is inputted into the event receiving means through the network means 301. When the user noticing the receipt of the event shows an intention of the event process with using the input apparatus, such as, the remoter controller, then the event receiving means 303 takes out the URL from the invention parameter received, and delivers it to the Web browser, so as to obtain the Web page for the event process, thereby displaying it to the user through the display means 302. Through the Web screen displayed, the user can notice the content of the event. Also, the user can operate the Web screen through the input means 306, so as to make remote control upon the network equipment generating the event.

For example, in the network, to which the camera 102 and the printer 103 are connected, as is shown in FIG. 1, it is assumed that the camera generates an event of detecting an object (an object detection event) when something moves on the front thereof, and that the printer generates an event when an operation error generated therein. With the event notification of the UPnP, the event and/or the operation parameter are regulated for each kind of the equipments, such as, the printer, or the camera, for example, and the equipment receiving the event executes the process, subjectively or actively, corresponding to the event.

Namely, in case when the event receiving apparatus 101 receives the object detection event of the camera 102, there is a necessity for the event receiving apparatus 101 to determine what the event received is, thereby to display the operation corresponding to that, such as, an image of the camera 102, on the monitor, for example. Also, in case when receiving the event from the printer 103, there is a necessity to determine the events received, and thereby execute the process corresponding to that.

On the contrary thereto, with the method according to the present invention, processing of the event is left to the event notifying apparatus, i.e., a side of notifying the event. Further, there is included the URL for accessing the Web page executing the process of the event generated by itself within the event notification, in the form of the event parameter. For that reason, the event receiving apparatus is able to deal with the various kinds of the events, but only with provision of the Web browser.

Also, with the event notification protocol according to the present invention, it is possible to deal with, by defining an event process URL tag, such as, <e:url> within a region of an event notification protocol vender of the UPnP, so as to put the event processing URL therein, for example. In this instance, for the UPnP-enable equipments, it is possible to install the event processes therein, according to the present invention, easily.

With applicability of the present invention into industry, it can be applied widely, such as, an event notification, and an event receiving process through the network, for example.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:
1. A network apparatus, comprising:
  a network communication unit connectable to a network, and configured to transmit and receive data through the network;
  an event producing unit, for enabling to deal with various kinds of events, but without knowing the meaning of the event issued by network equipments, configured to notify a change of an inside condition of the network apparatus, to other network equipment, via the network communication unit;

a Web server unit configured to send a file in response to a request from a Web browser, via the network communication unit;

a file storing unit coupled to the Web server unit, and configured to store an HTML file corresponding to an event, the HTML file is for providing indication of a reason of generation of the event and/or prompting execution of a process corresponding to the event; and an event correspondence storing unit coupled to the event producing unit, and configured to store URL information of a Web page which is outputted based on the HTML file and associated with the event generated, wherein the URL information of the Web page corresponding to the event generated, is obtained from said event correspondence storing unit, so as to notify of the event, including an event parameter therein, when the event is generated, wherein an event notification protocol of said event is an extension of UPnP, and an event message is issued, in which the URL information of the Web page corresponding to the event is put into a predetermined message extension area of an UPnP event message.

2. A network apparatus provided with a Web browser, comprising:

a network communication unit connectable to a network, and configured to conduct transmission and receipt of data through the network;

a display unit configured to display a user operation screen and a Web browser screen thereon, received via the network communication network; and an event receiving unit coupled to the network communication unit and configured to receive an event, which is issued by other network equipment without knowing the meaning of the event issued by the network equipment, wherein said event receiving unit initiates the Web browser so as to access a URL which is included in an event parameter, when detecting that the URL is included in the event parameter, wherein the URL is information for accessing a Web page which is displayed by an HTML file for providing indication of a reason of generation of the event and/or prompting execution of a process corresponding to the event, wherein an event notification protocol of said event is an extension of UPnP, and an event message is issued, in which the URL information of the Web page corresponding to the event is put into a predetermined message extension area of an UPnP event message.

3. A network apparatus provided with a Web browser, comprising:

a network communication unit connectable to a network, and configured to conduct transmission and receipt of data through the network;

a display unit configured to display a user operation screen and a Web browser screen thereon, received via the network communication unit; and an event receiving unit coupled to the network communication unit and configured to receive an event, which is issued by other network equipment without knowing the meaning of the event issued by the network equipment, wherein said event receiving unit includes a display prompting unit configured to prompt displaying a screen to a user of the network apparatus, indicating receipt of an event, when detecting that a URL is included in an event parameter of the event, and an inputting unit for the user to indicate a start of an event process in response to display on said display unit, and initiating the Web browser so as to access the URL, when detecting that the URL is included in the event parameter, wherein the URL is information for accessing a Web page which is displayed by an HTML file for providing indication of a reason of generation of the event and/or prompting execution of a access corresponding to the event, wherein an event notification protocol of said event is an extension of UPnP, and an event message is issued, in which the URL information of the Web page corresponding to the event is put into a predetermined message extension area of an UPnP event message.

4. An event processing method for equipment connected to a network, the method comprising:

notifying of an event via event notifying equipment, for enabling to deal with various kinds of events, but without knowing the meaning of the event issued by network equipments, and including URL information of a Web page corresponding to the event in form of a parameter; and obtaining the URL information from the event parameter, and retrieving and displaying the Web page, which is obtained through accessing the URL and executing a process corresponding to the event generated by said event notifying equipment, wherein the URL is information for access of a Web page which is displayed by an HTML file for showing a reason of generation of the event and/or prompting execution of a process corresponding to the event, wherein an event notification protocol of said event is an extension of UPnP, and an event message is issued, in which the URL information of the Web page corresponding to the event is put into a predetermined message extension area of an UPnP event message.

* * * * *

UNITED STATES PATENT AND TRADEMARK OFFICE
CERTIFICATE OF CORRECTION

PATENT NO. : 7,653,723 B2  Page 1 of 1
APPLICATION NO. : 11/369076
DATED : January 26, 2010
INVENTOR(S) : Tanaka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 731 days.

Signed and Sealed this

Twenty-eighth Day of December, 2010

David J. Kappos
*Director of the United States Patent and Trademark Office*